United States Patent
Nakanishi et al.

(10) Patent No.: US 11,252,790 B2
(45) Date of Patent: *Feb. 15, 2022

(54) CERAMIC HEATER

(71) Applicant: NGK SPARK PLUG CO., LTD, Nagoya (JP)

(72) Inventors: Naoya Nakanishi, Komaki (JP); Atsutoshi Sugiyama, Tajimi (JP); Yusuke Makino, Kasugai (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 528 days.

This patent is subject to a terminal disclaimer.

(21) Appl. No.: 16/314,318

(22) PCT Filed: Feb. 16, 2017

(86) PCT No.: PCT/JP2017/005656
§ 371 (c)(1),
(2) Date: Dec. 28, 2018

(87) PCT Pub. No.: WO2018/008178
PCT Pub. Date: Jan. 11, 2018

(65) Prior Publication Data
US 2019/0342951 A1    Nov. 7, 2019

(30) Foreign Application Priority Data

Jul. 5, 2016 (JP) .............................. JP2016-132935
Nov. 30, 2016 (JP) .............................. JP2016-231905
Feb. 8, 2017 (JP) .............................. JP2017-020886

(51) Int. Cl.
*H05B 3/14* (2006.01)
*H05B 3/18* (2006.01)
(Continued)

(52) U.S. Cl.
CPC ............. *H05B 3/141* (2013.01); *C04B 41/86* (2013.01); *H05B 3/18* (2013.01); *H05B 3/40* (2013.01);
(Continued)

(58) Field of Classification Search
None
See application file for complete search history.

(56) References Cited

U.S. PATENT DOCUMENTS 6,222,166 B1 * 4/2001 Lin .................. H05B 3/262
219/538
6,236,027 B1 * 5/2001 Miyata .................. H05B 3/141
219/270

(Continued)

FOREIGN PATENT DOCUMENTS

GB    2 244 898 A    12/1991
JP    H09-213461 A    8/1997
(Continued)

OTHER PUBLICATIONS

Japan Patent Office, International Search Report issued in corresponding Application No. PCT/JP2017/005656, dated Apr. 18, 2017.

(Continued)

*Primary Examiner* — Joseph M. Pelham
(74) *Attorney, Agent, or Firm* — Stites & Harbison, PLLC; Jeffrey A Haeberlin; James R. Hayne

(57) ABSTRACT

An object of the present invention is to suppress adhesion of scale to a surface of a ceramic heater that is used for fluid heating. The ceramic heater has a ceramic body and a coating layer. The ceramic body has a heat generation resistor. The coating layer contains glass as a main compo- (Continued)

nent and is formed so as to coat a surface of the ceramic body. The coating layer has a function of smoothing the surface of the ceramic body.

12 Claims, 8 Drawing Sheets

(51) Int. Cl.
| H05B 3/48 | (2006.01) |
| F24H 9/18 | (2006.01) |
| C04B 41/86 | (2006.01) |
| H05B 3/40 | (2006.01) |

(52) U.S. Cl.
CPC ........ *F24H 9/1818* (2013.01); *F24H 2250/02* (2013.01); *H05B 2203/013* (2013.01); *H05B 2203/021* (2013.01)

(56) References Cited

U.S. PATENT DOCUMENTS

| 2002/0127006 | A1* | 9/2002 | Tweedy | ................. | F24H 1/102 |
| | | | | | 392/451 |
| 2002/0153365 | A1* | 10/2002 | Taniguchi | ............... | F23Q 7/001 |
| | | | | | 219/270 |
| 2008/0210684 | A1* | 9/2008 | Kukino | ................. | B28B 11/242 |
| | | | | | 219/542 |
| 2020/0296802 | A1* | 9/2020 | Nakanishi | .............. | H05B 3/141 |

FOREIGN PATENT DOCUMENTS

| JP | 11-074063 | A | | 3/1999 |
| JP | 3038039 | B2 | | 5/2000 |
| JP | 3069747 | U | | 6/2000 |
| JP | 2001-284031 | A | | 10/2001 |
| JP | 2004028413 | A | * | 1/2004 |
| JP | 2004-281369 | A | | 10/2004 |
| JP | 2005-325413 | A | | 11/2005 |
| JP | 2006236617 | A | | 9/2006 |
| WO | 2004/024987 | A1 | | 3/2004 |
| WO | 2015-087937 | A1 | | 6/2015 |

OTHER PUBLICATIONS

Japan Patent Office, Written Opinion issued in corresponding Application No. PCT/JP2017/005656, dated Apr. 18, 2017. (Translation not available.).

European Patent Office, Extended European Search Report issued in corresponding Application No. EP 17 82 3787, dated Feb. 3, 2020.

Japan Patent Office, Office Action (Notice of Reasons for Refusal) issued in corresponding Application No. JP 2017-020866, dated Sep. 4, 2019.

\* cited by examiner

CERAMIC HEATER

TECHNICAL FIELD

The present invention relates to a ceramic heater used for, for instance, a warm water washing toilet seat, an electric water heater and a 24-hour bath.

BACKGROUND ART

The warm water washing toilet seat is usually provided with a heat exchange unit having a heat exchanger that is a resin case and a ceramic heater. The ceramic heater is used to warm washing water stored in the heat exchanger.

As this kind of ceramic heater, Patent Document 1 discloses a ceramic heater that is formed by winding a ceramic sheet, on which a heater wiring is printed, around a cylindrical ceramic support and integrally baking (or firing or burning) them.

CITATION LIST

Patent Document

Patent Document 1: Japanese Patent No. 3038039

SUMMARY OF THE INVENTION

Technical Problem

The ceramic heater for the warm water washing toilet seat is always in fluid such as water. Therefore, there arises a problem of adhesion of scale that is derived from calcia and/or magnesia to a surface of the ceramic heater in the process of use. This is understood that since grain-sized asperities or unevenness exist on the surface of the ceramic, the scale adheres to the surface of the ceramic heater.

It is known that occurrence of this scale in hard water is more frequent than that in soft water, and the scale is deposited on the surface of the ceramic heater by heating of the water. When the adhesion of the scale to the surface of the ceramic heater proceeds, by the fact that the scale deposited on the surface of the ceramic heater is peeling off from the ceramic heater, there is a risk that a water channel or pipe will get clogged with the scale.

As one aspect of the present disclosure, it is desirable to suppress the adhesion of the scale to the surface of the ceramic heater that is used for fluid heating.

Solution to Problem

A ceramic heater according to one aspect of the present disclosure has a ceramic body and a coating layer. The ceramic body has a heat generation resistor. The coating layer contains glass as a main component, and is formed so as to coat a surface of the ceramic body.

The coating layer has a function of smoothing the surface of the ceramic body.

More specifically, the coating layer is formed so that an arithmetic average surface roughness (Ra) of a surface of the coating layer is smaller than an arithmetic average surface roughness (Ra) of the surface of the ceramic body. According to such ceramic heater, by the fact that the surface of the ceramic body is covered or coated with the coating layer having glass as the main component, grain-sized asperities or unevenness existing on the surface of the ceramic are filled, thereby smoothing the surface of the ceramic body. It is therefore possible to suppress the adhesion of the scale to the surface of the ceramic heater.

Further, in the ceramic heater according to one aspect of the present disclosure, the coating layer could be formed so as to contain a component of glaze.

According to such ceramic heater, since the coating layer can be formed by applying the glaze to the ceramic heater and baking the glaze, it is possible to simplify a forming process of the coating layer.

Furthermore, in the ceramic heater according to one aspect of the present disclosure, the coating layer could be formed so that a deformation point of the coating layer is a maximum temperature during use of the ceramic heater or higher.

According to such ceramic heater, since the temperature of the deformation point of the coating layer is the maximum temperature during use of the ceramic heater or higher, the coating layer can be resistant to softening during use of the ceramic heater.

In addition, the ceramic heater according to one aspect of the present disclosure further could have a flange having an insertion hole and connected to the ceramic body through bonding material with the ceramic body inserted into the insertion hole. And, the coating layer could be formed so that a deformation point of the coating layer is a temperature of a deformation point or a melting point of the bonding material or higher.

According to such ceramic heater, since the deformation point of the coating layer is the temperature of the deformation point or the melting point of the bonding material or higher, even if heat is applied to the bonding material when connecting or bonding the flange to the ceramic body, the coating layer can be resistant to softening.

Moreover, in the ceramic heater according to one aspect of the present disclosure, the coating layer could be formed so that a coefficient of thermal expansion of the coating layer is smaller than that of the ceramic body.

According to such ceramic heater, in a cooling process after baking of the ceramic heater, the coating layer is in a state in which a compressive stress generated due to shrinkage of the ceramic body is given to the coating layer. Since a tensile stress can be hard to be applied to the coating layer, it is possible to improve resistance of the coating layer to thermal shock.

In the ceramic heater according to one aspect of the present disclosure, the ceramic body further could have a support which is made of ceramic and a ceramic sheet which is wound around an outer periphery of the support and in which the heat generation resistor is embedded.

According to such ceramic heater, since the ceramic body can be obtained by winding ceramic sheet around the support, heat can be generated in a wide area of the ceramic body as uniformly as possible.

Further, in the ceramic heater according to one aspect of the present disclosure, the coating layer could be formed so that a thickness of the coating layer is thinner than that of the ceramic sheet.

According to such ceramic heater, since the thickness of the coating layer is thinner than that of the ceramic sheet, it is possible to conduct heat generated by the heat generation resistor to fluid more efficiently.

Further, in the ceramic heater according to one aspect of the present disclosure, the coating layer could be formed so as to coat all of a region, where the heat generation resistor is arranged, of the ceramic sheet. According to such ceramic heater, since the coating layer covers or coats all of the region, where the heat generation resistor is arranged, of the ceramic sheet, even if the ceramic sheet expands and shrinks due to heat generation of the heat generation resistor and such a force as to unstick the ceramic sheet acts on the ceramic sheet, because the ceramic sheet is covered with the coating layer, it is possible to prevent the ceramic sheet from coming unstuck.

Further, in the ceramic heater according to one aspect of the present disclosure, the ceramic heater could be formed into a tubular shape or a columnar shape.

According to such ceramic heater, since the ceramic heater is formed into the tubular shape or the columnar shape, a surface area of the ceramic body can be increased by a simple shape. Therefore, it is possible to conduct heat generated by the heat generation resistor to fluid more efficiently.

Further, in the ceramic heater according to one aspect of the present disclosure, the ceramic heater could be formed into the tubular shape, and the coating layer could be formed so as to coat at least an outer peripheral surface of the surface of the ceramic body.

According to such ceramic heater, since the outer peripheral surface is covered or coated with the coating layer, it is possible to suppress the adhesion of the scale to the outer peripheral surface. In a case where the heat generation resistor is arranged along the outer periphery of the ceramic body, since the outer peripheral surface whose temperature becomes higher is covered or coated with the coating layer, an effect of suppressing the adhesion of the scale can be easily obtained.

Further, in the ceramic heater according to one aspect of the present disclosure, the coating layer could be formed so as to coat the outer peripheral surface and an inner peripheral surface of the surface of the ceramic body.

According to such ceramic heater, since the outer peripheral surface and the inner peripheral surface are covered or coated with the coating layer, it is also possible to suppress the scale that is deposited on the inner peripheral surface of the ceramic body due to the fluid passing through or flowing through an inside of the ceramic body.

Further, in the ceramic heater according to one aspect of the present disclosure, the coating layer could be made of lead-free material.

According to such ceramic heater, since the coating layer is made of lead-free material, it is possible to suppress change of color of the coating layer which is caused by the fact that the material contains the lead when exposed to a reduction atmosphere.

EMBODIMENTS FOR CARRYING OUT THE INVENTION

Embodiments of the present disclosure will be explained below with reference to the drawings.

1. Embodiment

[1-1. Configuration]

A ceramic heater 11 of the present embodiment is, for instance, a ceramic heater used to warm the washing water in the heat exchanger of the heat exchange unit of the warm water washing toilet seat.

Figure 1:
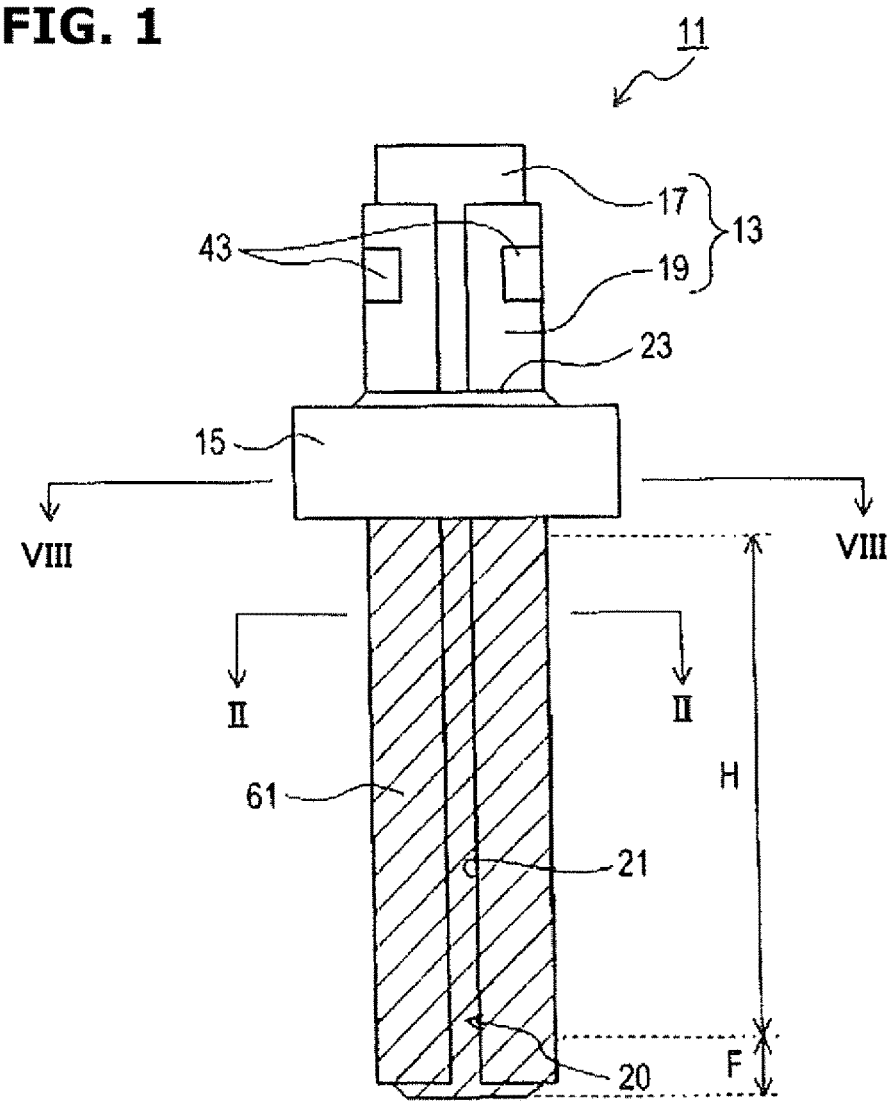
FIG. 1 is a front view of a ceramic heater according to an embodiment.

As shown in FIG. 1, this ceramic heater 11 has a cylindrical ceramic heater body 13 and a flange 15 that is fitted onto the heater body 13. The flange 15 is formed with, for instance, ceramic such as alumina. The heater body 13 and the flange 15 are connected or bonded together with glass brazing material 23.

Figure 2:
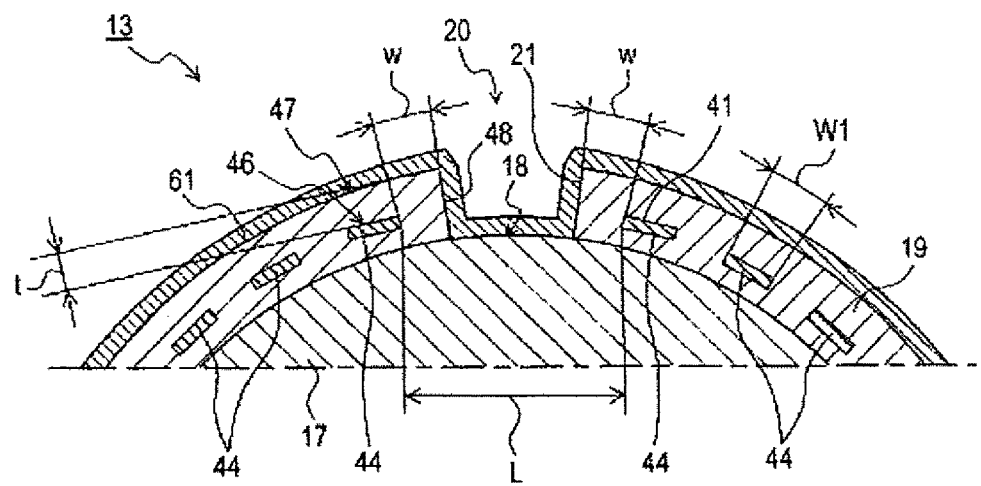
FIG. 2 is a sectional view taken along II-II line of FIG. 1.

As shown in FIGS. 1 and 2, the heater body 13 is structured by a cylindrical ceramic support 17 and a ceramic sheet 19 wound around an outer periphery of the support 17. The support 17 is shaped into a cylindrical shape having a penetration hole 17A (see FIGS. 9 and 10) that penetrates the support 17 in an axial tip end direction. In the present embodiment, the support 17 and the ceramic sheet 19 are made of ceramic such as alumina ($Al_2O_3$). A thermal expansion coefficient of alumina is within a range from $50 \times 10^{-7}$/K to $90 \times 10^{-7}$/K. In the present embodiment, it is $70 \times 10^{-7}$/K (30° C.-380° C.).

Further, in the present embodiment, an outside diameter of the support 17 is set to 12 mm, an inside diameter of the support 17 is set to 8 mm, and a length of the support 17 is set to 65 mm. A thickness of the ceramic sheet 19 is set to 0.5 mm and a length of the ceramic sheet 19 is set to 60 mm. Here, the ceramic sheet 19 does not completely cover the outer periphery of the support 17. Therefore, a slit 21 that extends along an axial direction of the support 17 is formed at a winding mating portion 20 of the ceramic sheet 19. In addition, in the present embodiment, at least a part of a surface of the support 17 and at least a part of a surface of the ceramic sheet 19 are covered or coated with a glaze layer 61.

The glaze layer 61 is formed as glass ceramic that contains 60-74 wt % Si in terms of $SiO_2$ and 16-30 wt % Al in terms of $Al_2O_3$. That is, the glaze layer 61 is made of lead-free material. Here, the lead-free material means material containing no lead. However, the lead-free material is not limited to material that does not completely contain lead, but could be material that contains a trace quantity of lead as long as the trace quantity of lead is such a quantity that change of color of the material which is caused by the fact that the material contains the lead when exposed to a reduction atmosphere is not visible.

The glaze layer 61 is formed by baking applied or coated glaze. The glaze used for the glaze layer 61 of the present embodiment is a glaze whose transition point is 830° C., whose deformation point is 900° C. or higher and whose melting point is 1128° C.

The transition point indicates a temperature at which a gradient of a thermal expansion curve changes rapidly. The deformation point indicates a temperature at which spread or elongation of glass can no longer be detected due to softening of the glass in a thermal expansion measurement and this appears as a bending point of the thermal expansion curve.

A thermal expansion coefficient of the glaze layer 61 is $60 \times 10^{-7}/K$ (30° C.-700° C.). That is, the glaze layer 61 is formed so that a coefficient of thermal expansion of the glaze layer 61 is smaller than that of the support 17 of the heater body 13.

Material of the glaze layer 61 is selected so that the deformation point of the glaze layer 61 is a maximum temperature during use of the ceramic heater 11 or higher. It is noted that specifications of a heater wiring 41 could be determined according to the deformation point of the glaze layer 61. Here, the maximum temperature during use of the ceramic heater 11 means, for instance, a temperature of the heater wiring 41 when the heater wiring 41 generates heat at a maximum output during use of the ceramic heater 11.

Figure 3:
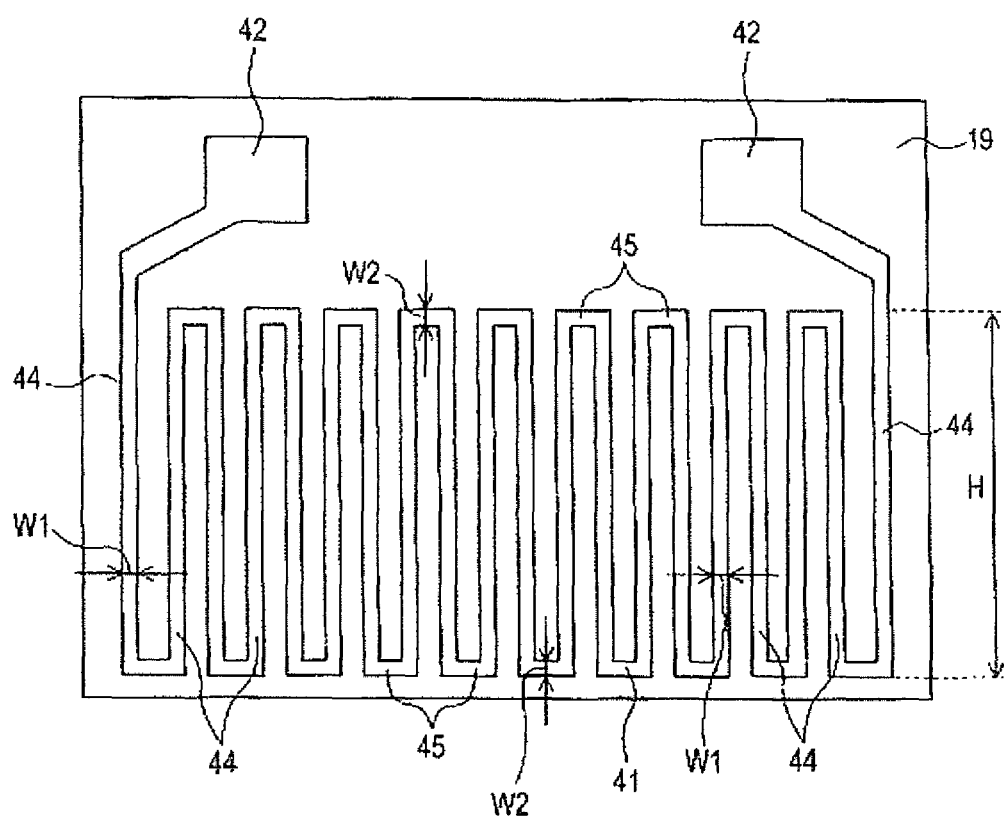
FIG. 3 is an explanatory drawing with a ceramic sheet developed.

That is, the glaze and the output of the heater wiring 41 etc. are set so that a temperature of the glaze layer 61 does not become a temperature of the deformation point of the glaze or higher by the heater wiring 41. As shown in FIGS. 2 and 3, the heater wiring 41 having a serpentine pattern and a pair of internal terminals 42 are provided inside the ceramic sheet 19. In the present embodiment, the heater wiring 41 and the internal terminals 42 contain tungsten (W) as a main component. The internal terminals 42 are electrically connected to respective external terminals 43 that are formed on an outer peripheral surface of the ceramic sheet 19 through via conductors (not shown) etc., as shown in FIG. 1.

The heater wiring 41 has a plurality of wiring portions 44 that extend along the axial direction of the support 17 and connecting portions 45 that connect adjacent two wiring portions 44. A pair of wiring portions 44 positioned at both end portions when viewing the ceramic sheet 19 from a thickness direction are arranged on opposite sides of the winding mating portion 20 of the ceramic sheet 19 as shown in FIG. 2, and a first end of the wiring portion 44 is connected to the internal terminal 42 and a second end of the wiring portion 44 is connected to another second end of the adjacent wiring portion 44 through the connecting portion 45.

Here, the first end indicates an upper end in FIG. 3, and the second end indicates a lower end in FIG. 3. Further, with regard to the wiring portions 44 arranged between the pair of wiring portions 44 positioned at both end portions when viewing the ceramic sheet 19 from the thickness direction, the first end of the wiring portion 44 is connected to another first end of the adjacent wiring portion 44 through the connecting portion 45, and the second end of the wiring portion 44 is connected to another second end of the adjacent wiring portion 44 through the connecting portion 45.

As shown in FIGS. 2 and 3, a line width W1 of the wiring portion 44 of the present embodiment is set to 0.60 mm, and a thickness of the wiring portion 44 is set to 15 μm. Likewise, a line width W2 of the connecting portion 45 of the present embodiment is set to 0.60 mm, and a thickness of the connecting portion 45 is set to 15 μm. That is, the line width W1 of the wiring portion 44 is the same as the line width W2 of the connecting portion 45. Further, the thickness of the wiring portion 44 is also the same as the thickness of the connecting portion 45. Therefore, a cross-sectional area of the wiring portion 44 is equal to a cross-sectional area of the connecting portion 45.

As shown in FIG. 2, in the ceramic sheet 19, a thickness t from a surface 46 of the wiring portion 44, which becomes the heater wiring 41 afterwards, to an outer peripheral surface 47 of the ceramic sheet 19 is 0.2 mm. Further, a distance w from an end edge of the wiring portion 44 to an end surface 48 of the ceramic sheet 19 at the winding mating portion 20 is 0.7 mm. Here, the "distance w" is a length along a circumferential direction of the support 17 that is cylindrical in shape. Moreover, a distance L between the pair of wiring portions 44 arranged on opposite sides of the winding mating portion 20 is 2.4 mm. Here, the "distance L" is a length of a straight line that connects both end edges of the pair of wiring portions 44. A width of the slit 21 formed at the winding mating portion 20 is derived from an expression of "L-2w", and in the present embodiment, it is 1 mm.

Figure 10:
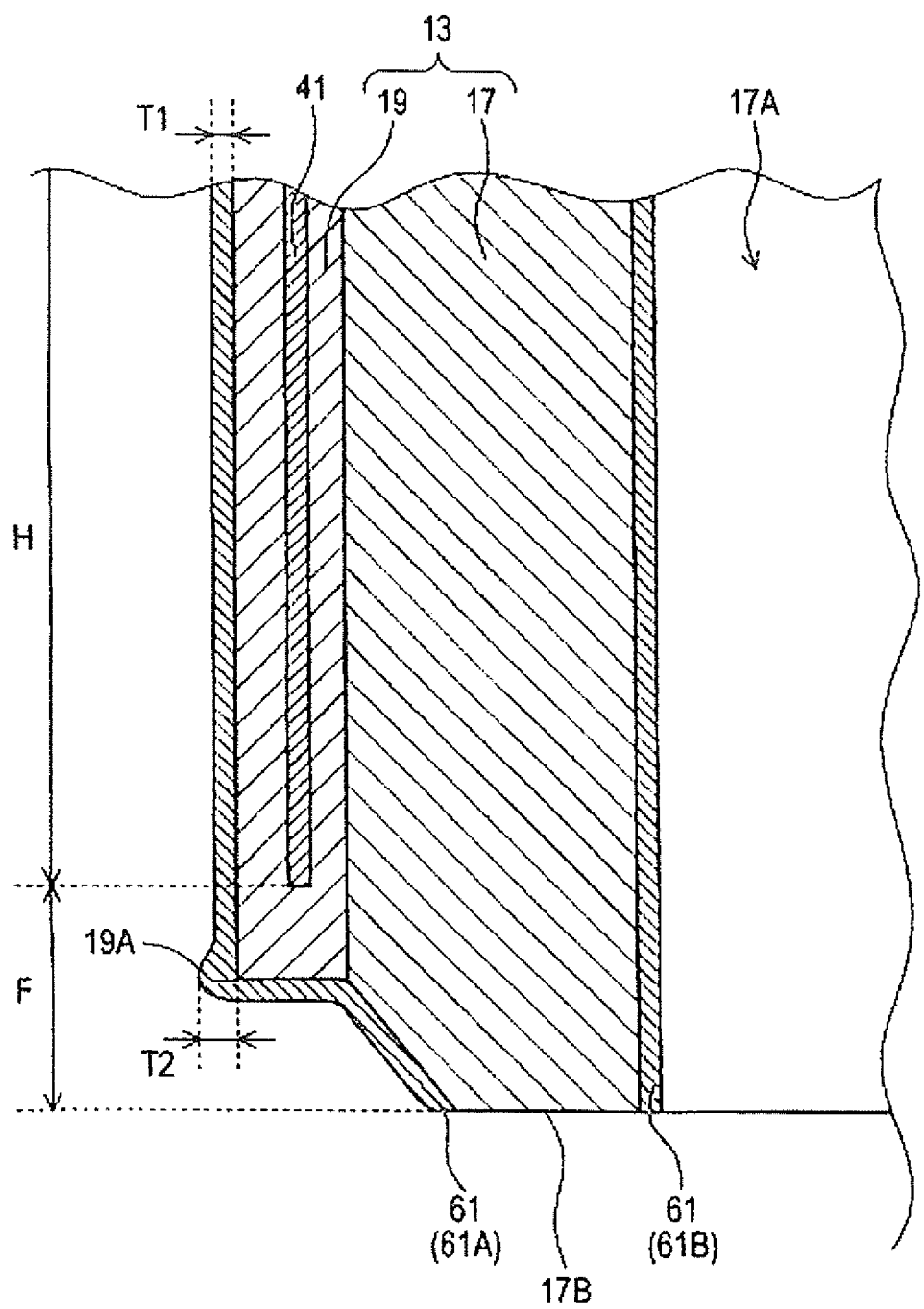
FIG. 10 is a local sectional view showing a sectional structure in a top end region of the ceramic heater.

Next, As shown in FIG. 10, the glaze layer 61 has an outer surface coating layer 61A and an inner surface coating layer 61B.

The outer surface coating layer 61A is formed so as to cover or coat at least a forming region of the heater wiring 41 of a cylindrical outer surface (or a tubular outer surface) of the heater body 13 (the support 17 and the ceramic sheet 19). The inner surface coating layer 61B is formed so as to cover or coat at least a region H, where the heater wiring 41 is arranged, of a cylindrical inner surface (or a tubular inner surface) (an inner surface of the penetration hole 17A) of the heater body 13 (the support 17 and the ceramic sheet 19).

Further, the outer surface coating layer 61A is formed so as to cover or coat at least a part of a top end side region F that is located at a top end side with respect to the region H, where the heater wiring 41 is arranged, of the heater body 13 (the support 17 and the ceramic sheet 19). Furthermore, the outer surface coating layer 61A is set so that a maximum value T2 of a thickness of the outer surface coating layer 61A in the top end side region F is greater than a maximum value T1 of the thickness of the outer surface coating layer 61A in the region H (T2>T1).

The heater body 13 has a stepped portion 19A on the cylindrical outer surface in the top end side region F located at the top end side with respect to the region H. The stepped portion 19A is a top end portion of the ceramic sheet 19, and also is a portion whose radial direction size changes on the cylindrical outer surface of the heater body 13.

Then, the outer surface coating layer 61A is set so that the thickness of the outer surface coating layer 61 is the maximum value T2 at the stepped portion 19A on the cylindrical outer surface of the heater body 13.

[1-2. Manufacturing Method]

Next, a method of manufacturing the ceramic heater 11 will be explained.

Figure 4:
FIG. 4 is an explanatory drawing showing a method of manufacturing the ceramic heater (1).

First, a clay-like slurry containing alumina as a main component is charged into a conventionally known extruder (not shown), and a tubular member is molded. After drying the molded tubular member, the dried molded tubular member undergoes a calcination (a pre-firing or a pre-baking) at a predetermined temperature (e.g. approx. 100° C.), then the support 17 as shown in FIG. 4 is obtained.

Further, using ceramic material whose main component is alumina powder, first and second ceramic green sheets 51 and 52 which become the ceramic sheet 19 afterwards are formed. As a method of forming the ceramic green sheet, a well-known molding method such as a doctor blade method can be used.

Figure 5:
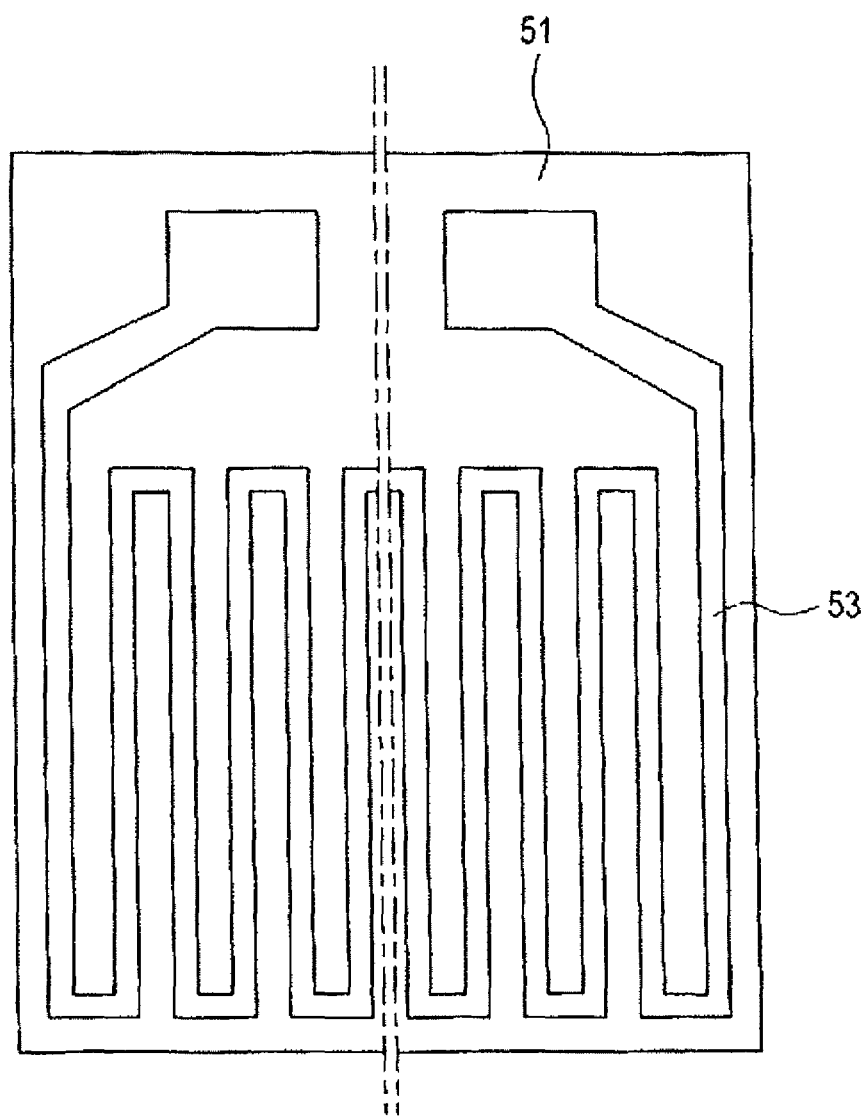
FIG. 5 is an explanatory drawing showing the method of manufacturing the ceramic heater (2).

Then, using a well-known paste printing device (not shown), a conductive paste is printed on a surface of the first ceramic green sheet 51. In the present embodiment, as the conductive paste, a tungsten paste is employed. As a result, as shown in FIG. 5, an unbaked electrode 53 which becomes the heater wiring 41 and the internal terminals 42 afterwards is formed on the surface of the first ceramic green sheet 51.

A position of the unbaked electrode 53 is adjusted, for instance, so as to be a size obtained by adding shrinkage during baking with respect to a position of the heater wiring 41.

Figure 6:
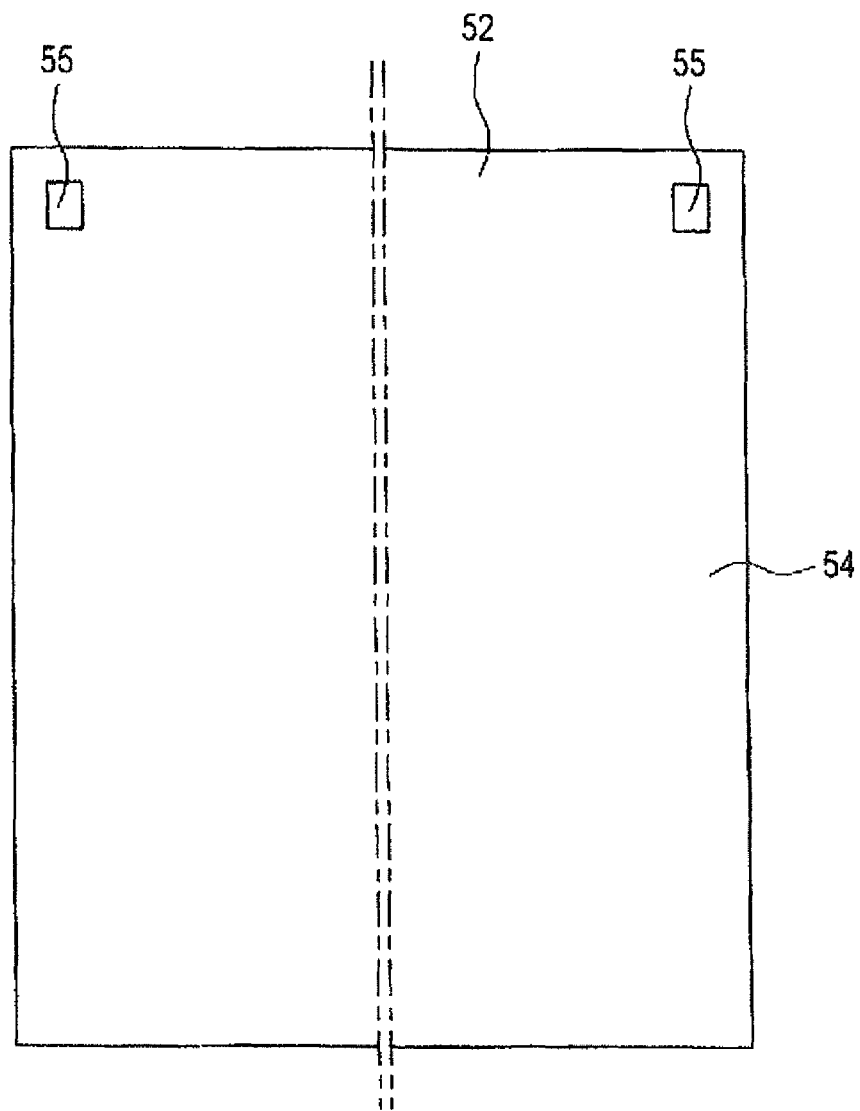
FIG. 6 is an explanatory drawing showing the method of manufacturing the ceramic heater (3).

After drying the conductive paste, the second ceramic green sheet 52 is laminated on a printed surface of the first ceramic green sheet 51, i.e. a surface on which the unbaked electrode 53 is formed, and a pressing force is given to this laminate in a sheet laminating direction. As a result, as shown in FIG. 6, the first and second ceramic green sheets 51 and 52 are united, and a green sheet laminate 54 is formed.

Here, a thickness of the second ceramic green sheet 52 is adjusted, for instance, so as to be a size obtained by adding shrinkage during the baking with respect to the thickness t from an outermost arranged wiring portion 44 of the wiring portions 44 of the heater wiring 41 to the outer peripheral surface 47 of the ceramic sheet 19. Further, using the paste printing device, conductive pastes are printed on a surface of the second ceramic green sheet 52. As a result, unbaked electrodes 55 which become the external terminals 43 afterwards are formed on the surface of the second ceramic green sheet 52.

Figure 7:
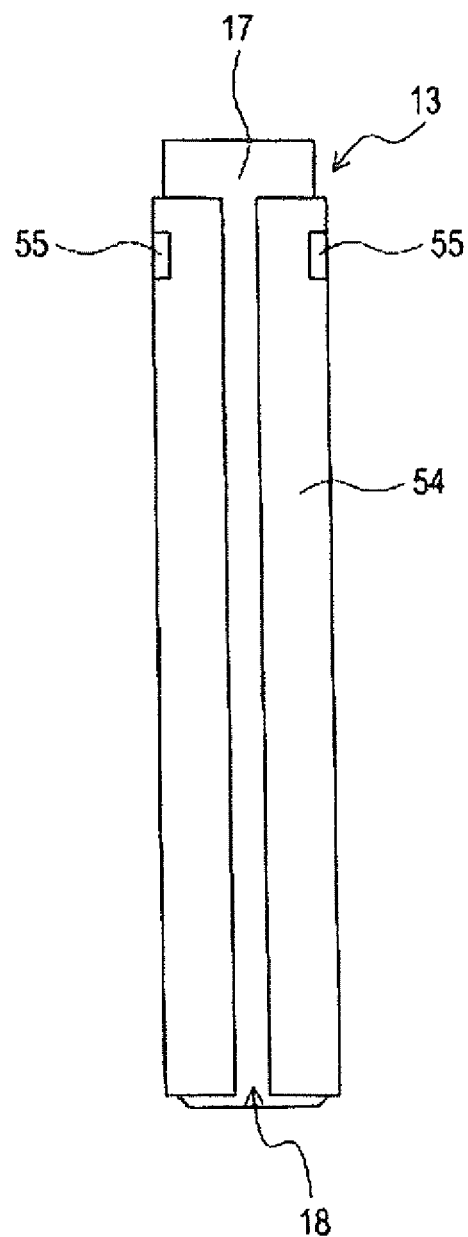
FIG. 7 is an explanatory drawing showing the method of manufacturing the ceramic heater (4).

Next, as shown in FIG. 7, ceramic paste such as alumina paste is applied to one side surface of the green sheet laminate 54, and the green sheet laminate 54 is wound around and bonded to an outer peripheral surface 18 of the support 17. At this time, a size of the green sheet laminate 54 is adjusted in order for both end portions of the green sheet laminate 54 not to overlap each other.

Next, glaze is applied to a predetermined region that is located at a top end side with respect to the unbaked electrodes 55. After carrying out a drying process and a degreasing process by a well-known method, a simultaneous baking (or a simultaneous firing) is carried out at a predetermined temperature at which alumina and tungsten of the green sheet laminate 54 can be sintered. The predetermined temperature here is, for instance, about 1400° C.-1600° C.

As a result, alumina in the ceramic green sheets 51 and 52 and tungsten in the conductive paste are simultaneously sintered. Then, the green sheet laminate 54 becomes the ceramic sheet 19, the unbaked electrode 53 becomes the heater wiring 41 and the internal terminals 42, and the unbaked electrodes 55 become the external terminals 43. Also, the glaze layer 61 is formed at the predetermined region that is located at the top end side with respect to the external terminals 43.

With regard to the application of the glaze mentioned above, the glaze is applied to the top end side of the support 17, for instance, by soaking the top end side of the support 17 with the ceramic sheet 19 sintered, i.e. by soaking an end of the support 17, which is one end side located away from the external terminals 43, downward in a vertical direction, in a bath in which the glaze is stored so as to soak the support 17 from the top end side of the support 17 up to a predetermined position of the support 17.

It is noted that the predetermined position indicates, as shown in FIGS. 1 and 3, a position that covers or coats all of the region H when a region, where the heater wiring 41 is arranged, of the ceramic sheet 19 is the region H, and also a position at which the external terminals 43 are not covered or coated. In FIG. 1, a region shown by a hatch pattern indicates a region where the glaze layer 61 is formed. The region H indicates an area where the heater wiring 41 is arranged with the heater wiring 41 folded back.

By this process, the glaze is applied to an outer peripheral surface and an inner peripheral surface of the surface of the heater body 13. Then, by baking or firing this, the outer peripheral surface and the inner peripheral surface of the surface of the heater body 13 are covered or coated with the glaze layer 61.

The thickness of the glaze layer 61 can be arbitrarily set by adjusting a viscosity of the glaze. As a method of applying the glaze, an arbitrary method such as application with a brush and spray coating can be employed. By using these applying methods, a state of application of the glaze, which relates to the thickness of the glaze layer 61, is adjusted so that the maximum value T2 of the thickness of the outer surface coating layer 61A in the top end side region F is greater than the maximum value T1 of the thickness of the outer surface coating layer 61A in the region H (T2>T1). In the present embodiment, the state of application of the glaze is adjusted so that the thickness of the outer surface coating layer 61A is the maximum value T2. Further, in the present embodiment, in order not to form the glaze layer 61 on a top end surface 17B of the support 17 of the heater body 13, a process that removes the glaze having been applied to the top end surface 17B is carried out before baking. The thickness of the glaze layer 61 (more specifically, maximum values of the outer surface coating layer 61A and the inner surface coating layer 61B) is adjusted at a time of the application of the glaze so as to be thinner than a thickness of the green sheet laminate 54.

Afterwards, the external terminals 43 are plated with nickel, then the heater body 13 is obtained. Here, the glaze layer 61 could be formed by applying the glaze to the sintered heater body 13 and baking this.

Figure 8:
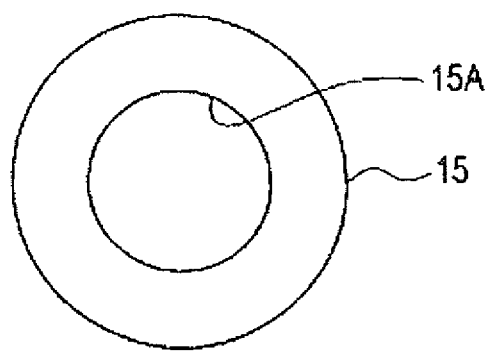
FIG. 8 is a sectional view taken along VIII-VIII line of FIG. 1.
Figure 9:
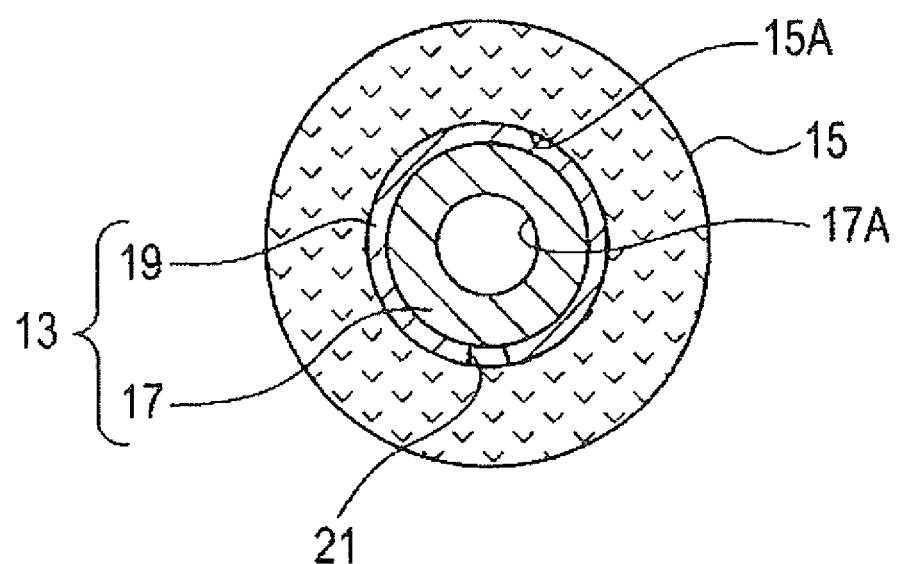
FIG. 9 is a plan view of a flange.

Next, the flange 15 made of alumina is fitted onto the heater body 13 at a predetermined fixing position of the heater body 13. That is, as shown in FIGS. 1 and 8, the flange 15 is formed into a cylinder having an insertion hole 15A at a center, and as shown in FIGS. 1 and 9, the flange 15 is held with the heater body 13 inserted into the insertion hole 15A.

At this time, as shown in FIG. 1, the heater body 13 and the flange 15 are fixed together by welding through the glass brazing material 23, then the ceramic heater 11 is completed. Here, as the glass brazing material 23, for instance, material such as BH-W made by Nippon Electric Glass could be used. In a case where this material is used, a transition point of the glass brazing material 23 is 470° C., and a deformation point of the glass brazing material 23 is 550° C.

That is, the glaze and the glass brazing material 23 are set so that a temperature of the deformation point of the glaze layer 61 is the deformation point of the glass brazing material 23 or higher.

[1-3. Example of Experiment]

An example of experiment that was carried out to evaluate performance of the ceramic heater 11 of the present embodiment will be explained below.

First, measurement samples were prepared as follows. A ceramic heater, called sample A, is the following; a thickness t from the surface of the heater wiring to the outer peripheral surface of the ceramic sheet is 0.18 mm, a distance w from the end edge of the heater wiring to the end surface of the ceramic sheet is 0.6 mm, a distance L between the pair of wiring portions arranged on opposite sides of the winding mating portion is 1.4 mm, a width (=L-2w) of the slit formed at the winding mating portion is 0.2 mm, and the glaze layer is formed. Here, regarding a definition of the thickness t, the distance w and the distance L, it is the same as a definition of those shown in FIG. 2.

Further, as a comparative example, a ceramic heater provided with no glaze layer 61, called sample B, was prepared. A difference between the sample A and the sample B is only the presence or absence of the glaze layer, and other structures are the same.

Each cross-section of the samples A and B was obtained by a SEM, and the glaze layer, an arithmetic average surface roughness (Ra) of the surface of the ceramic sheet and a thickness of the laminating direction were identified from cross-sectional SEM images obtained. And, the arithmetic average surface roughness (Ra) of the surface of the sample A was smaller than the arithmetic average surface roughness (Ra) of the surface of the sample B. From this, it can be said that the arithmetic average surface roughness (Ra) of the glaze layer is smaller than the arithmetic average surface roughness (Ra) of the surface of the ceramic sheet. Further, the thickness of the glaze layer 61 was thinner than that of the ceramic sheet.

When the heaters of the samples A and B were operated in tap water with the tap water flowing under the same conditions, a result obtained showed that a quantity of scale that adheres to the sample A was decreased as compared with a quantity of scale that adheres to the sample B.

[1-4. Effect]

According to the embodiment described above, the following effects can be obtained.

(1a) The ceramic heater 11 has the heater body 13 and the glaze layer 61. The heater body 13 has the heater wiring 41. The glaze layer 61 has glass as a main component, and is formed so as to cover the surface of the heater body 13. The glaze layer 61 has the function of smoothing the surface of the heater body 13. More specifically, the glaze layer 61 is formed so that the arithmetic average surface roughness (Ra) of the surface of the glaze layer 61 is smaller than the arithmetic average surface roughness (Ra) of the surface of the heater body 13.

According to such ceramic heater 11, by the fact that the surface of the heater body 13 is covered or coated with the glaze layer 61 having glass as the main component, grain-sized asperities or unevenness existing on the surface of the ceramic are filled, thereby smoothing the surface of the heater body 13. It is therefore possible to suppress the adhesion of the scale to the surface of the ceramic heater 11.

(1b) The glaze layer 61 of the ceramic heater 11 is formed so as to contain component of glaze.

According to such ceramic heater 11, since the glaze layer 61 can be formed by applying the glaze to the ceramic heater 11 and baking the glaze, it is possible to simplify a forming process of the glaze layer 61.

(1c) The glaze layer 61 of the ceramic heater 11 is formed so that the deformation point of the glaze layer 61 is the maximum temperature during use of the ceramic heater 11 or higher.

According to such ceramic heater 11, since the temperature of the deformation point of the glaze layer 61 is the maximum temperature during use of the ceramic heater 11 or higher, the glaze layer 61 can be resistant to softening during use of the ceramic heater 11.

(1d) The ceramic heater 11 further has the flange 15 having the insertion hole 15A and connected or bonded to the heater body 13 through the glass brazing material 23 with the heater body 13 inserted into the insertion hole 15A. And, the glaze layer 61 is formed so that the temperature of the deformation point of the glaze layer 61 is the deformation point of the glass brazing material 23 or higher.

According to such ceramic heater 11, since the temperature of the deformation point of the glaze layer 61 is the deformation point of the glass brazing material 23 or higher, even if heat is applied to the glass brazing material 23 when connecting or bonding the flange 15 to the heater body 13, the glaze layer 61 can be resistant to softening.

(1e) The glaze layer 61 of the ceramic heater 11 is formed so that the coefficient of thermal expansion of the glaze layer 61 is smaller than that of the support 17 of the heater body 13.

According to such ceramic heater 11, in a cooling process after baking of the ceramic heater 11, the glaze layer 61 is in a state in which a compressive stress generated due to shrinkage of the heater body 13 is given to the glaze layer 61. Since a tensile stress can be hard to be applied to the glaze layer 61, it is possible to improve resistance of the glaze layer 61 to thermal shock.

(1f) The heater body 13 of the ceramic heater 11 further has the ceramic support 17 and the ceramic sheet 19 which is wound around the outer periphery of the support 17 and in which the heater wiring 41 is embedded.

According to such ceramic heater 11, since the heater body 13 can be obtained by winding the ceramic sheet 19 around the support 17, heat can be generated in a wide area of the heater body 13 as uniformly as possible.

(1g) The glaze layer 61 of the ceramic heater 11 is formed so that the thickness of the glaze layer 61 is thinner than that of the ceramic sheet 19.

According to such ceramic heater 11, since the thickness of the glaze layer 61 is thinner than that of the ceramic sheet 19, it is possible to conduct heat generated by the heater wiring 41 to fluid more efficiently.

(1h) The glaze layer 61 of the ceramic heater 11 is formed so as to cover or coat all of the region, where the heater wiring 41 is arranged, of the ceramic sheet 19.

According to such ceramic heater 11, since the glaze layer 61 covers or coats all of the region, where the heater wiring 41 is arranged, of the ceramic sheet 19, even if the ceramic sheet 19 expands and shrinks due to heat generation of the heater wiring 41 and such a force as to unstick the ceramic sheet 19 acts on the ceramic sheet 19, because the ceramic sheet 19 is covered with the glaze layer 61, it is possible to prevent the ceramic sheet 19 from coming unstuck.

(1i) The ceramic heater 11 is formed into the cylindrical or tubular shape or a columnar shape.

According to such ceramic heater 11, since the ceramic heater 11 is formed into the cylindrical or tubular shape or the columnar shape, a surface area of the heater body 13 can be increased by a simple shape. Therefore, it is possible to conduct heat generated by the heater wiring 41 to fluid more efficiently.

(1j) The ceramic heater 11 is formed into the tubular shape, and the glaze layer 61 is formed so as to cover or coat at least the outer peripheral surface of the surface of the heater body 13.

According to such ceramic heater 11, since the outer peripheral surface is covered or coated with the glaze layer 61, it is possible to suppress the adhesion of the scale to the outer peripheral surface. In a case where the heater wiring 41 is arranged along the outer periphery of the heater body 13, since the outer peripheral surface whose temperature becomes higher is covered or coated with the glaze layer 61, an effect of suppressing the adhesion of the scale can be easily obtained.

(1k) The glaze layer 61 of the ceramic heater 11 could be formed so as to cover or coat the outer peripheral surface and the inner peripheral surface of the surface of the heater body 13.

According to such ceramic heater 11, since the outer peripheral surface and the inner peripheral surface are covered or coated with the glaze layer 61, it is also possible to suppress the scale that is deposited on the inner peripheral surface of the heater body 13 due to the fluid passing through or flowing through an inside of the heater body 13.

(11) The glaze layer 61 of the ceramic heater 11 is made of lead-free material.

According to such ceramic heater 11, since the glaze layer 61 is made of lead-free material, it is possible to suppress change of color of the glaze layer 61 which is caused by the fact that the material contains the lead when exposed to a reduction atmosphere.

2. Other Embodiments

Although the present invention has been explained according to the embodiment described above, the present invention is not limited to the above embodiment, but includes various modifications.

(2a) In the above embodiment, the support 17 of the ceramic heater 11 has the cylindrical or tubular shape. However, the shape of the support 17 is not limited to this. The support 17 could have, for instance, a rod shape or a plate shape. In other words, the ceramic heater 11 could be used for, for instance, an electric water heater and a 24-hour bath, other than the warm water washing toilet seat.

(2b) In the above embodiment, although type of voltage applied between the pair of internal terminals 42 is not specified, AC voltage can be applied between the pair of internal terminals 42, and DC voltage can be applied between the pair of internal terminals 42.

(2c) In the above embodiment, the glaze layer 61 is formed at the ceramic heater 11. However, this is not limited to the glaze layer 61. For instance, a coating layer having glass as a main component and containing a trace quantity of metal such as iron as a mixture could be formed at the ceramic heater 11.

(2d) The above embodiment specifies that the maximum temperature during use of the ceramic heater 11 is the maximum temperature of the heater wiring 41 when the heater wiring 41 generates heat during use of the ceramic heater 11. However, even if the maximum temperature of the heater wiring 41 exceeds the temperature of the deformation point of the glaze layer 61, there is no problem as long as a temperature of a coating layer 61 becomes the deformation point of the glaze layer 61 or lower. That is, the maximum temperature during use of the ceramic heater 11 could be a maximum temperature of the glaze layer 61.

(2e) In the above embodiment, the setting is made so that the deformation point of the glaze layer 61 is the deformation point of the glass brazing material 23 or higher or the maximum temperature during use of the ceramic heater 11 or higher. However, the setting is not limited to this. For instance, in a case where a metallized layer is formed on the outer peripheral surface of the heater body 13 and a metal flange is connected or bonded on the metallized layer using metal brazing material, the setting could be made so that the deformation point of the glaze layer 61 is a melting point of the metal brazing material or higher. Although change of color of the glaze may occur if the glaze contains lead, since the connection (or bonding) is carried oud in a reduction atmosphere in order for the metal brazing material not to oxidize and the glaze layer 61 used in the present embodiment is made of lead-free material, it is possible to suppress the change of color which is caused by the fact that the lead exists in the reduction atmosphere. Further, the setting could be made so that the transition point of the glaze layer 61 is the transition point of the glass brazing material 23 or higher or the maximum temperature during use of the ceramic heater 11 or higher. Moreover, the setting could be made so that a softening point of the glaze layer 61 is a softening point of the glass brazing material 23 or higher or the maximum temperature during use of the ceramic heater 11 or higher.

(2f) A plurality of functions which one component of the above embodiment has could be realized by a plurality of components, and one function which one component of the above embodiment has could be realized by a plurality of components. Further, a plurality of functions which a plurality components have could be realized by one component, and one function realized by a plurality components could be realized by one component. In addition, a part of the above configuration or structure could be omitted. Moreover, at least a part of the above configuration or structure could be added to a configuration or structure of other embodiment described above, or might be replaced. The present invention includes all design modifications and equivalents belonging to the technical scope of the present invention.

(2g) The present invention can be realized by not only the above ceramic heater 11, but also various aspects such as a system having the ceramic heater 11 as a component.

3. Correspondence of Term

The heater wiring 41 corresponds to an example of a heat generation resistor, and the heater body 13 corresponds to an example of a ceramic body. Further, the glaze layer 61 corresponds to an example of a coating layer, and the glass brazing material 23 corresponds to an example of a connecting or bonding material.

EXPLANATION OF REFERENCE

11 . . . ceramic heater, 13 . . . heater body, 15 . . . flange, 15A . . . insertion hole, 17 . . . support, 17A . . . penetration hole, 17B . . . top end surface, 18 . . . outer peripheral surface, 19 . . . ceramic sheet, 19A . . . stepped portion, 20 . . . winding mating portion, 21 . . . slit, 23 . . . glass brazing material, 41 . . . heater wiring, 61 . . . glaze layer, 61A . . . outer surface coating layer, 61B . . . inner surface coating layer.

What is claimed is:

1. A ceramic heater for fluid heating comprising:
   a ceramic body having a heat generation resistor; and
   a coating layer containing glass as a main component and formed so as to coat a surface of the ceramic body, wherein
   the coating layer has a function of smoothing the surface of the ceramic body, the ceramic body further has;
     a support which is made of ceramic; and
     a ceramic sheet which is wound around an outer periphery of the support and in which the heat generation resistor is embedded, and
   a maximum value of a thickness of the coating layer in a region from a top end of the heat generation resistor to a top end of the ceramic sheet is greater than a maximum value of a thickness of the coating layer in a region where the heat generation resistor is arranged.

2. The ceramic heater as claimed in claim 1, wherein:
   the coating layer is formed so that an arithmetic average surface roughness (Ra) of a surface of the coating layer is smaller than an arithmetic average surface roughness (Ra) of the surface of the ceramic body.

3. The ceramic heater as claimed in claim 1, wherein:
the coating layer is formed so as to contain a component of glaze.

4. The ceramic heater as claimed in claim 3, wherein:
the glaze is formed so that a deformation point of the glaze is a maximum temperature during use of the ceramic heater or higher.

5. The ceramic heater as claimed in claim 3, further comprising:
- a flange having an insertion hole and connected to the ceramic body through bonding material with the ceramic body inserted into the insertion hole, and wherein
- the glaze is formed so that a deformation point of the glaze is a temperature of a deformation point or a melting point of the bonding material or higher.

6. The ceramic heater as claimed in claim 1, wherein:
the coating layer is formed so that a coefficent of thermal expansion of the coating layer is smaller than that of the ceramic body.

7. The ceramic heater as claimed in claim 1, wherein:
the coating layer is formed so that a thickness of the coating layer is thinner than that of the ceramic sheet.

8. The ceramic heater as claimed in claim 1, wherein:
the coating layer is formed so as to coat all of a region, where the heat generation resistor is arranged, of the ceramic sheet.

9. The ceramic heater as claimed in claim 1, wherein:
the ceramic heater is formed into a tubular shape or a columnar shape.

10. The ceramic heater as claimed in claim 1, wherein:
the ceramic heater is formed into a tubular shape, and
the coating layer is formed so as to coat at least an outer peripheral surface of the surface of the ceramic body.

11. The ceramic heater as claimed in claim 10, wherein:
the coating layer is formed so as to coat the outer peripheral surface and an inner peripheral surface of the surface of the ceramic body.

12. The ceramic heater as claimed in claim 1, wherein:
the coating layer is made of lead-free material.

* * * * *